(12) United States Patent
Gregory et al.

(10) Patent No.: US 12,472,297 B2
(45) Date of Patent: Nov. 18, 2025

(54) CANNULATOR COLLET LATCH (71) Applicant: Vitara Biomedical, Inc., Philadelphia, PA (US)

(72) Inventors: Christopher C. Gregory, Newtown, PA (US); Jeff Kiersh, Exton, PA (US)

(73) Assignee: Vitara Biomedical, Inc., Philadelphia, PA (US)

( * ) Notice: Subject to any disclaimer, the term of this patent is extended or adjusted under 35 U.S.C. 154(b) by 420 days.

(21) Appl. No.: 18/087,449

(22) Filed: Dec. 22, 2022

(65) Prior Publication Data

US 2023/0191013 A1 Jun. 22, 2023

Related U.S. Application Data

(60) Provisional application No. 63/292,733, filed on Dec. 22, 2021.

(51) Int. Cl.
*A61M 1/36* (2006.01)
*A61M 60/148* (2021.01)

(52) U.S. Cl.
CPC ........ *A61M 1/3653* (2013.01); *A61M 60/148* (2021.01); *A61M 1/3659* (2014.02)

(58) Field of Classification Search
CPC .............. A61M 1/3653; A61M 1/3659; A61M 1/3666; A61M 2240/00; A61M 25/04; A61M 60/148
See application file for complete search history.

(56) References Cited

U.S. PATENT DOCUMENTS

11,471,351 B2 10/2022 Flake et al.
2021/0338270 A1 11/2021 Flake et al.

*Primary Examiner* — Jon Eric C Morales (57) ABSTRACT

A cannula system for cannulating a blood vessel comprising a collet comprising at least a first collet wing and a second collet wing and defining a collet lumen, where each of the first collet wing and the second collet wing define a distal end and a proximal end; a cannula positioned within the collet lumen; a latch defined on the distal end of the first collet wing; and a coupler defined on the distal end of the second collet wing and configured to couple to the latch of the first collet wing, thereby securing the first collet wing to the second collet wing.

20 Claims, 13 Drawing Sheets

CANNULATOR COLLET LATCH

CROSS-REFERENCE TO RELATED APPLICATIONS

This application claims the benefit of priority under 35 U.S.C. § 119(e) to earlier filed U.S. patent application Ser. No. 63/292,733, filed on Dec. 22, 2021, the disclosure of which is incorporated by reference in its entirety.

BACKGROUND OF THE INVENTION

Extreme prematurity is the leading cause of infant morbidity and mortality in the United States for children under the age of five, with over one third of all infant deaths and one-half of cerebral palsy diagnoses attributed to prematurity. Respiratory failure represents the most common and challenging problem associated with extreme prematurity, as gas exchange in critically preterm neonates is impaired by structural and functional immaturity of the lungs. Advances in neonatal intensive care have achieved improved survival and pushed the limits of viability of preterm neonates from about 23 to about 24 weeks gestation, which marks the transition from the canalicular to the saccular phase of lung development. Although survival has become possible, there is still a high rate of chronic lung disease and other complications of organ immaturity, particularly in neonates born prior to 28 weeks gestation. The development of a system that could support normal neonatal growth and organ maturation for even a few weeks could significantly reduce the morbidity and mortality of extreme prematurity and improve quality of life in survivors.

In such systems, it can be necessary for cannula or catheter structure to be attached to an anatomical vessel. The currently available technologies do not allow secure attachment without sutures being placed through the tissue and secured to the cannula. If the attachment needs to be done quickly or with a single hand, the attachment cannot be sutured and must be done by a gripping mechanism. Such mechanisms as they currently exist are dependent on the flexing qualities of cantilevered clamping features. The cantilevered nature of the clamping means that flexing in the cantilever results in a loss of compression of and thus grip on the tissue. Accordingly, there is a need to make the attachment between a cannula and anatomical vessel more secure.

SUMMARY

The present invention satisfies this need by creating interlocking features on the gripping elements thus eliminating the dependence on the cantilevered form of the clamp or collets. Accordingly, in one aspect, provided herein is a cannula system for cannulating a blood vessel comprising: a collet comprising at least a first collet wing and a second collet wing and defining a collet lumen, where each of the first collet wing and the second collet wing define a distal end and a proximal end; a cannula positioned within the collet lumen; a latch defined on the distal end of the first collet wing; and a coupler defined on the distal end of the second collet wing and configured to couple to the latch of the first collet wing, thereby securing the first collet wing to the second collet wing.

In another aspect there is provided herein a cannula system for cannulating a blood vessel comprising: a collet comprising at least a first collet wing and a second collet wing and defining a collet lumen, where each of the first collet wing and the second collet wing define a distal end and a proximal end; a cannula positioned within the collet lumen; a latch defined on the distal end of the first collet wing, wherein the latch defines a toothed edge, and the coupler comprises another latch with another toothed edge configured to receive the toothed edge of latch of the first collet wing; and a coupler defined on the distal end of the second collet wing and configured to couple to the latch of the first collet wing, thereby securing the first collet wing to the second collet wing.

In yet aspect there is provided herein a method of cannulating a blood vessel in a tissue, comprising: inserting a cannula into a lumen defined by the blood vessel; positioning a first collet wing and a second collet wing along an external surface of the blood vessel, wherein the first collet wing and the second collet wing define a collet lumen, and the cannula is positioned within the collet lumen; exerting a compressive force on a distal end of the first collet wing and a distal end of the second collet wing; and securing the first collet wing to the second collet wing via a latch defined on the first collet wing and a coupler defined on the second collet wing.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DETAILED DESCRIPTION OF THE INVENTION

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

Improved cannula systems are described herein. The cannula system includes a collet defining a collet lumen. The collet can also include two or more collet wings that extend distally away from a collet base. A first collet wing can include a latch at the wing's distal end, and a second collet wing can include a corresponding coupler at the wing's distal end configured to couple to the first collet wing's latch. Thus, the distal ends of the collet can be secured to one another, which can reduce the possibility of collet distortion and increase the stability of the cannula system's attachment to a cannulated region (e.g., a blood vessel, and the like)

Extracorporeal Support Systems

Figure 3:
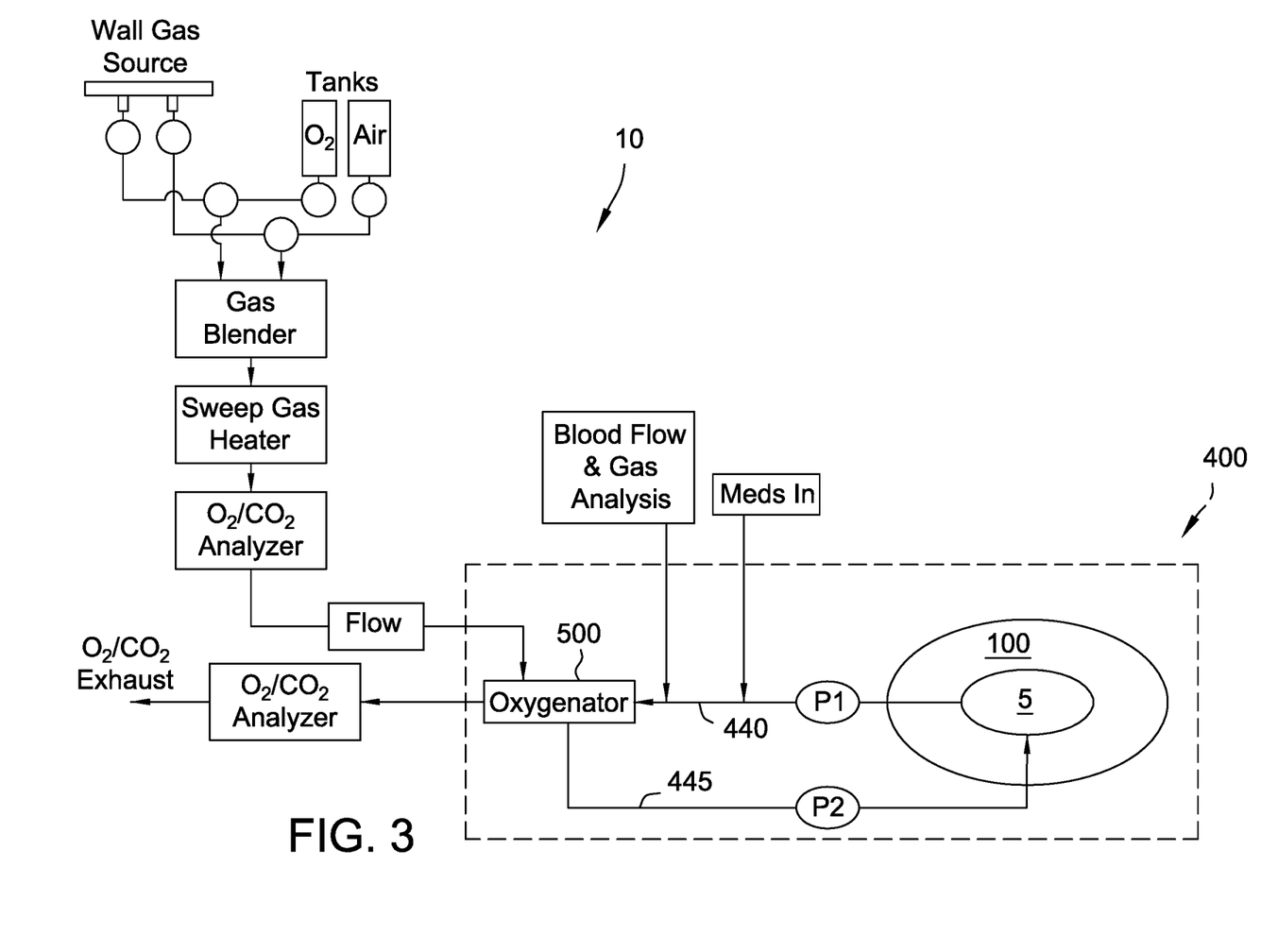
FIG. 3 depicts a schematic of an extracorporeal support system according to an aspect of the disclosure.

Referring now to FIG. 3, one aspect of the disclosure provides cannula systems for implementation with an extracorporeal support system particularly useful for neonates.

Figure 4:
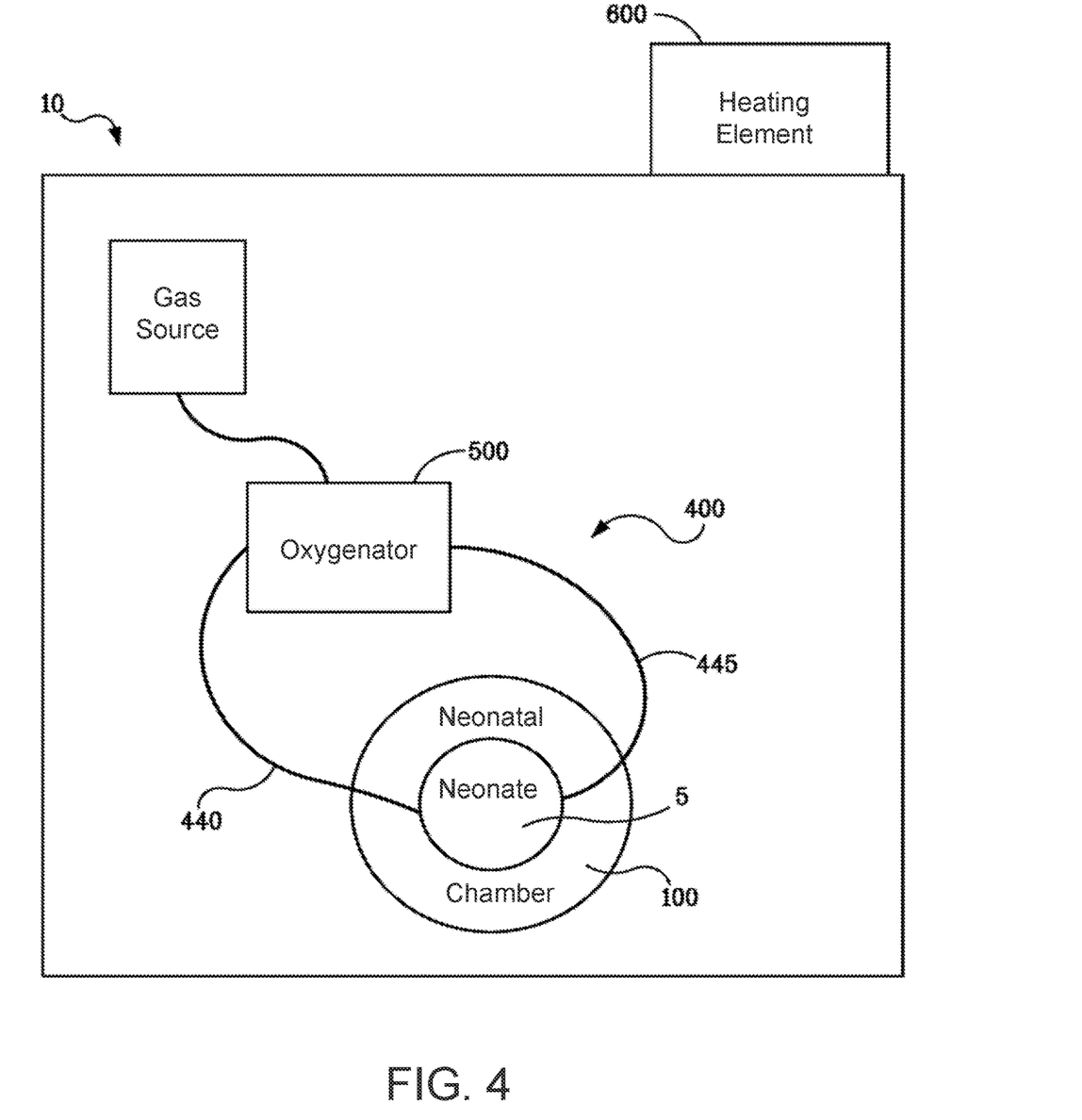
FIG. 4 depicts a schematic of a portion of an extracorporeal support system according to another aspect of the disclosure.
Figure 5:
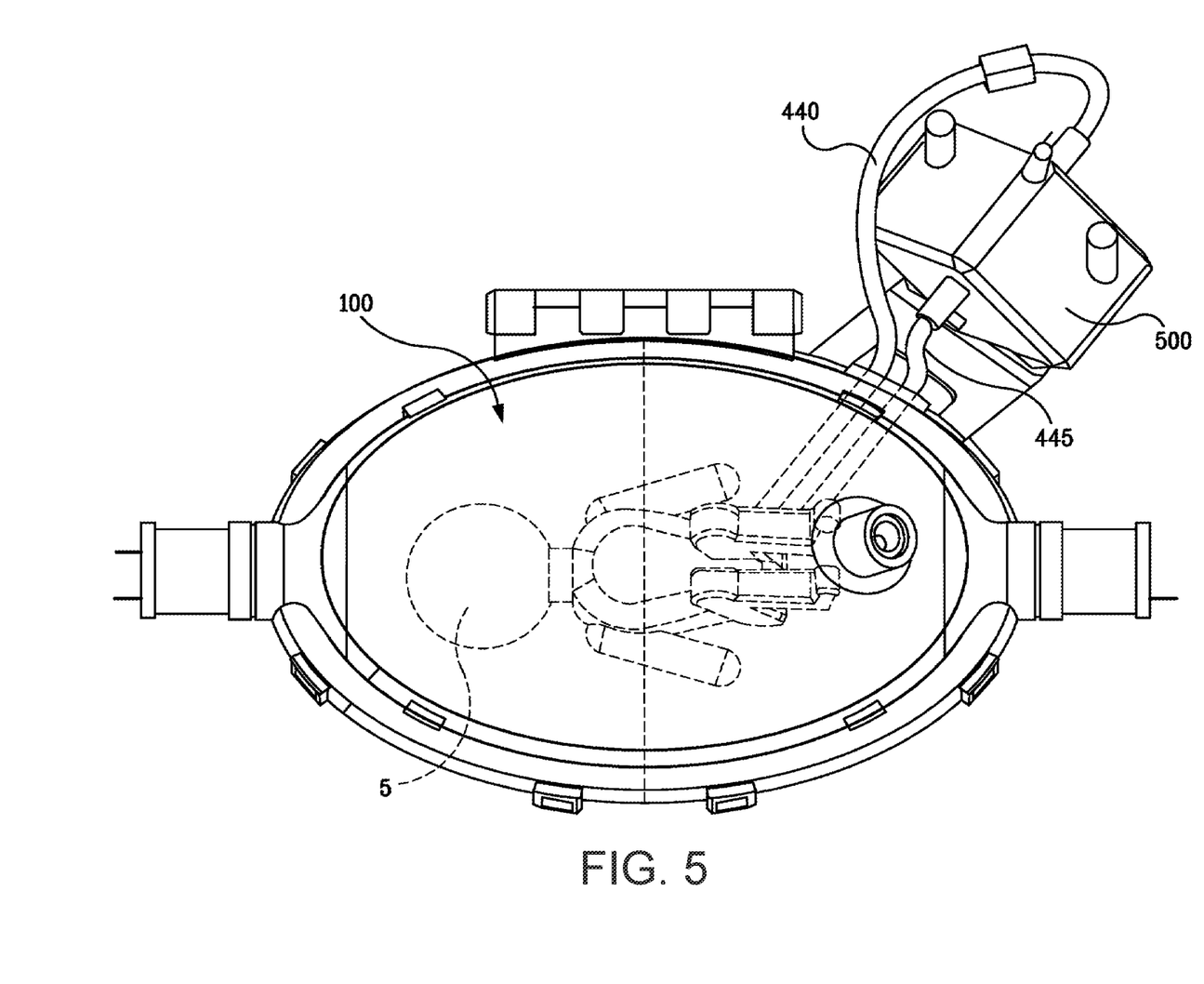
FIG. 5 depicts an isometric view of a portion of an extracorporeal support system according to yet another aspect of the disclosure.

Referring to FIGS. 3-5, a system 10 is configured to provide extracorporeal support to a neonate. According to one aspect of the disclosure, the system 10 may be configured to provide a system environment that is similar to an environment the neonate would experience in utero. Viability of a neonate that is removed from the uterine environment (e.g., due to preterm birth) and that is, for example, between about 23 weeks to about 24 weeks gestation, may be increased by placing the neonate in the system 10 environment.

According to an aspect of the disclosure, the system environment may be configured to accomplish any one of the following: (1) limit exposure of the neonate to light; (2) limit exposure of the neonate to sound; (3) maintain the neonate submerged within a liquid environment; (4) maintain the neonate within a desired temperature range; (5) minimize exposure to environmental contaminants; or (5) any combination thereof. The system also permits neonatal activities (e.g., neonatal breathing movements, neonatal swallowing of fluid) necessary for organ growth and development.

The system 10 may be configured to treat neonates (e.g., less than 37 weeks estimated gestational age, particularly 28 to 32 weeks estimated gestational age), or extreme premature neonates (23 to 28 weeks estimated gestational age). The gestation periods are provided for humans, though corresponding preterm neonates of other animals may be used. In a particular embodiment, the neonate has no underlying congenital disease. The term or preterm neonate may have limited capacity for pulmonary gas exchange, for example, due to pulmonary hypoplasia or a congenital anomaly affecting lung development, such as congenital diaphragmatic hernia. In a particular aspect, the subject may be a preterm or term neonate awaiting lung transplantation, for example, due to congenital pulmonary disease (e.g., bronchoalveolar dysplasia, surfactant protein B deficiency, and the like). Such transplantation surgeries are currently rarely performed in the United States. However, the number of transplantation surgeries may be increased with the more stable method for pulmonary support provided by the instant invention. The neonate 5 may also be a candidate for ex utero intrapartum treatment (EXIT) delivery, including patients with severe airway lesions and a long-expected course before definitive resection. The neonate 5 may also be a neonatal surgical or fetoscopic procedure patient, particularly with preterm labor precipitating early delivery. According to one aspect of the disclosure, the system 10 may be configured such that the neonate 5 is maintained in the system 10 for as long as needed (for example, for days, weeks or months, until the neonate 5 is capable of life without the system 10). The system 10 should be operable to maintain the neonate 5 for at least 7 days, at least 14 days, at least 21 days, at least 28 days, at least 35 days, at least 42 days, at least 49 days, or at least 56 days.

The system 10 includes a neonatal chamber 100 configured to house a neonate 5, a physiologic saline solution (PSS) circuit configured to provide a flow (e.g., a constant flow) of PSS through the neonatal chamber 100, and an oxygenation circuit 400 configured to remove carbon dioxide from the neonate's blood and supply oxygen to the neonate's blood.

The system 10 is configured to maintain the neonate 5 in the neonatal chamber 100 immersed in PSS. The system 10 is further configured such that the oxygenation circuit 400 provides adequate gas exchange for the neonate 5 to sustain life. In this way, the system 10 provides an environment similar to an intrauterine environment to facilitate continued growth and development of the neonate 5. The system 10 may include a cart or similar device that facilitates monitoring, caring for, and transporting the neonate 5 within a medical facility.

According to an aspect of this disclosure, the system 10 may be as described in pending U.S. Pat. No. 11,471,351 entitled "System and Method Configured to Provide Extracorporeal Support for Premature Fetus".

The oxygenation circuit 400 can be connected with the neonate 5 in a venous/venous arrangement (e.g., with a mechanical pump included in the system 10). Alternatively, the oxygenation circuit 400 may be connected with the neonate 5 in an arterial/venous arrangement. Cannulas may be placed in the great neck vessels (e.g., carotid, jugular) of the neonate 5 to connect the circulatory system of the neonate 5 to the oxygenator 500. The placement in the great neck vessels may avoid issues of vasospasm and cannula instability in umbilical vessels. An external portion of the cannulas may be fitted with a sleeve (e.g., to permit increased tension of the stabilizing sutures). The sleeve may be made of silicone and may be, for example, about 1-10 cm in length, particularly about 3-5 cm in length. The cannulas may be sutured to the neonate 5 (for example via the fitted sleeve) to secure the cannulas to the neck of the neonate 5.

In some embodiments, the oxygenation circuit 400 may be connected to the neonate 5 via the neonate's umbilical cord. In such an arrangement, cannulas may be sutured into the veins and arteries of the umbilical cord. It will be appreciated that other connection arrangements may be utilized. A non-suturing device is described in U.S. Provisional Application No. 63/017,204.

The oxygenation circuit 400 may include an oxygenator 500 for providing gas exchange functionality, particularly of oxygen (to) and carbon dioxide (from), to the neonate 5. The oxygenator 500 can be removably connected to the neonate 5 and, optionally, to other components of the oxygenation circuit 400 and the system 10. The oxygenator 500 is connected with the neonate 5 via two or more fluid lines and includes at least a drain line 440 and an inlet line 445. Blood flows from the neonate 5 though the drain line 440 to the oxygenator 500. The blood then flows through the oxygenator 500 and returns to the neonate 5 via the inlet line 445.

In some embodiments, the oxygenator 500 may be configured to be disconnected and replaced while the oxygenation circuit 400 is operational. If the oxygenator 500 is damaged or has surpassed its expected life cycle (typically 8 hours based on regulatory approvals), the oxygenation circuit 400 may be temporarily configurable to bypass the oxygenator 500 so that the oxygenator 500 may be disconnected from the oxygenation circuit 400 and a new, primed, oxygenator 500 connected in its place without interruption of blood flow.

Cannula System

Figure 1:
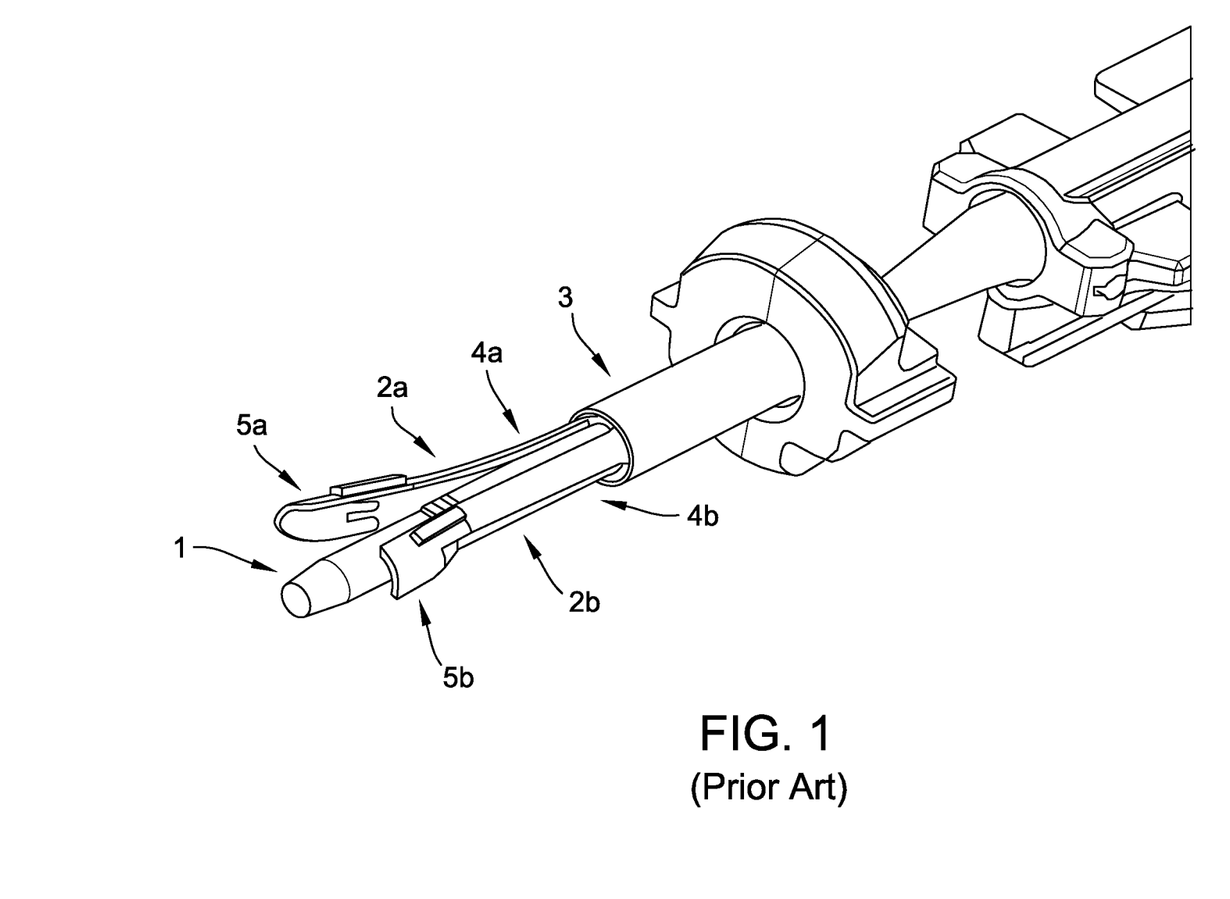
FIGS. 1 and 2 depict cannula systems.
Figure 2:
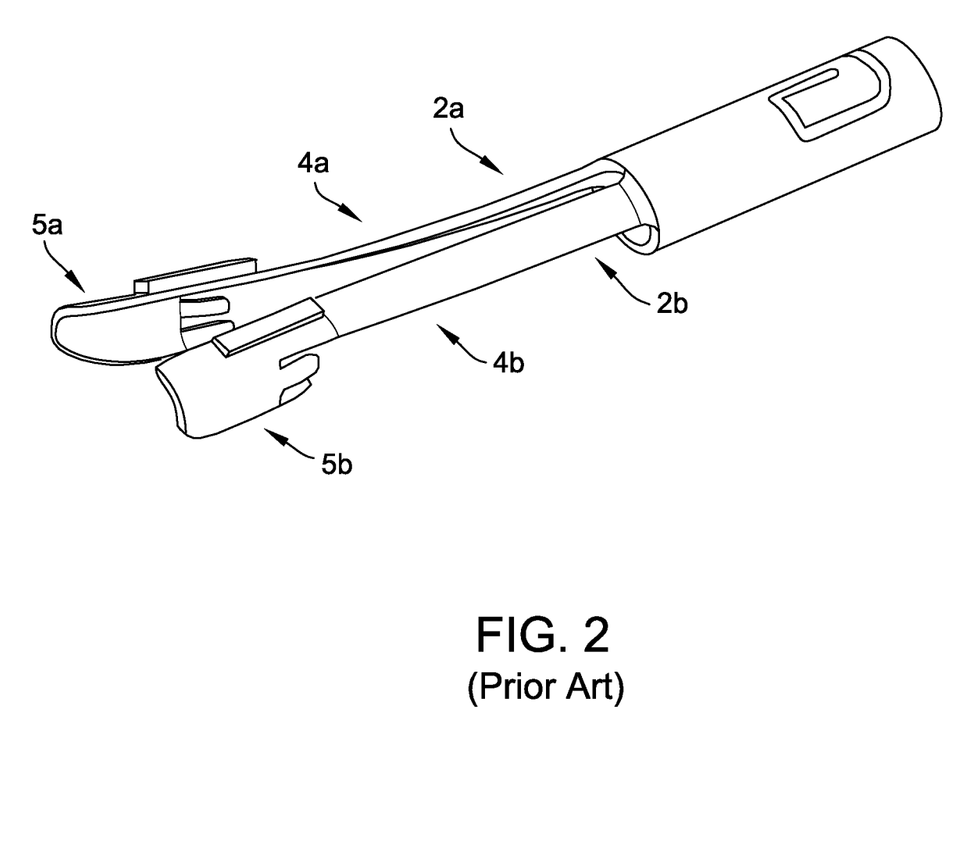

Cannula systems can facilitate cannulation of veins, arteries, and the like, of a patient. Cannula systems typically include a trocar for puncturing a patient body and a cannula for insertion into the patient via the puncturing. Prior Art FIGS. 1 and 2 depict cannula systems. The cannula system of FIGS. 1 and 2 includes a central collet. The collet includes a collet body and splayed collet wings 2a and 2b comprising cantilevered arms 4a and 4b, and gripping ends, 5a and 5b. After the tip of the cannula is inserted into a vessel, an axially sliding tube 3 is moved along the cannula 1 axis to collapse the collet wings 2a and 2b onto the exterior of the vessel. The collapsing gripping ends 5a and 5b are intended to press the vessel wall against the outside of the cannula 1, clamping the tissue to the outside of the cannula 1. Since the clamping action is only at the proximal end of the collet wings 2a and 2b, the collet wings 2a and 2b can deform, and the distal end of the collet wings 2a and 2b can spread. This will reduce the effectiveness of the clamping action resulting in a less secure connection. Further, if the collet wings 2a and 2b are not collapsed parallel to the cannula 1 inside, the lack of clamping can allow a space to form between the cannula 1 and the collet wings 2a and 2b. If the vessel carries blood, such a space can result in stagnant flow and thrombosis.

Cannula Collet

Figure 6:
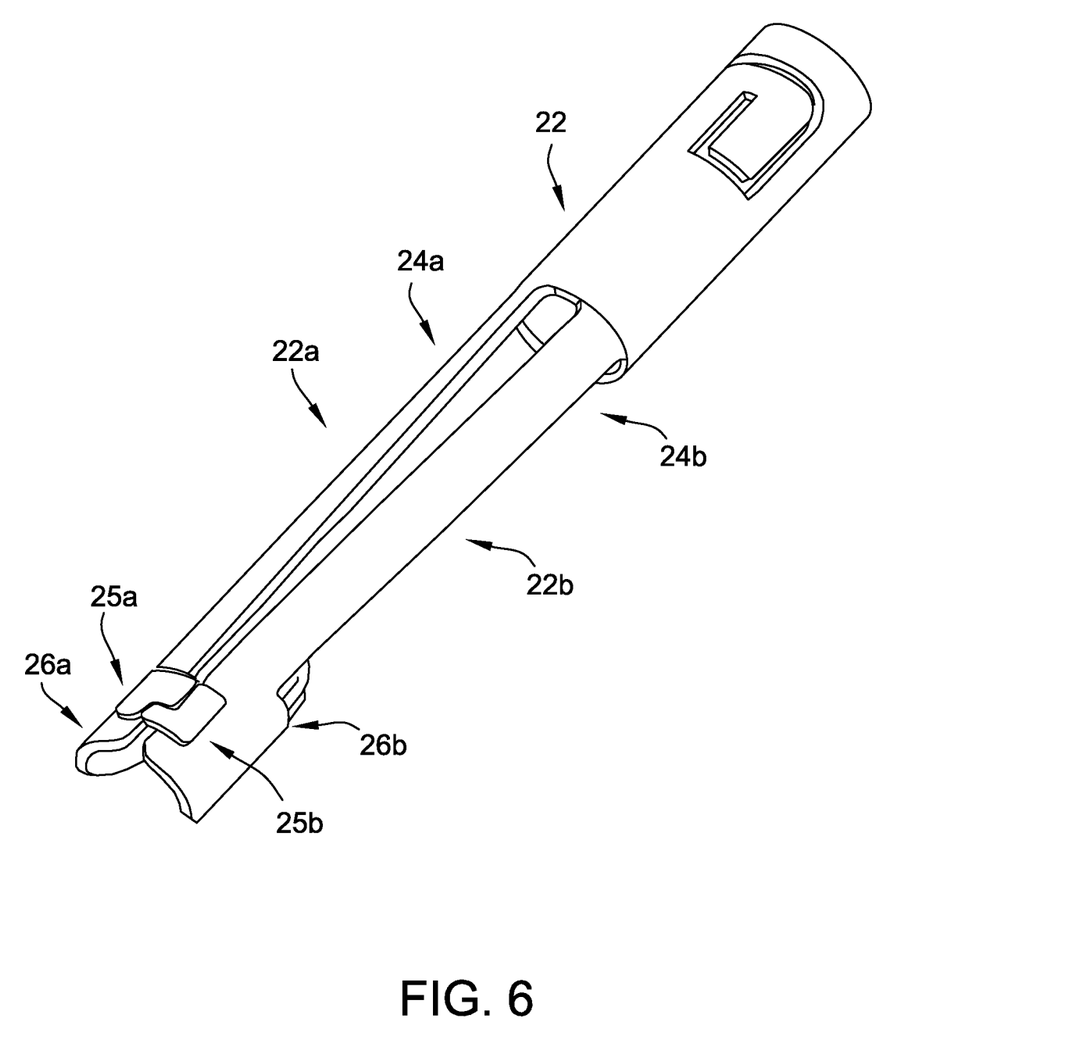
FIGS. 6-10 depict cannula collets according to embodiments of the present disclosure.

FIG. 6 depicts a cannula collet according to embodiments of the present disclosure. The cannula collet may be integrated into the oxygenation circuit 400 with reference to FIGS. 3-5. In some cases, the cannula collet may be integrated into the cannula insertion system described with reference to U.S. Patent Publication No. 2021/0338270 A1.

The cannula collet can define a collet lumen configured for a cannula to be positioned within the collet lumen. In some cases, the collet lumen may be partially "open," such that the collet does not completely enclose the lumen (e.g., concentrically). In other cases, the collet may fully enclose the collet lumen.

The collet can include a base portion 22 and a plurality of collet wings 22a, 22b having cantilevered arms 24a and 24b, and gripping ends 26a and 26b. Each collet wing 22a, 22b can originate on a ring face of the collet base portion 22 and can extend to further define the collet lumen defined by the base portion 22. In some embodiments, the collet wings 22a, 22b can taper towards the distal ends of the collet wings and have a thickness at the distal end that is less than the thickness at the base portion. In an alternative embodiment, the thickness of the cantilevered arms 24a, 24b can be approximately the same as the thickness of the ring face of the base portion 22. Further, while embodiments discussed in the present disclosure focus on two collet wings, the collet can include a plurality of collet wings or more than two collet wings, or one collet wing split into two or more sections and one skilled in the art will understand that the cannula collet can implement various quantities of collet wings.

Collet Wing Latches

At least one of the collet wings (e.g., 22a) can include a latch (e.g., 25a) on the distal end (e.g., gripping end 26a) of the collet wing. The latch 25a can be configured to couple to another distal end of another collet wing (e.g., 22b) of the collet. While depicted as disposed on a top surface of the collet wing, the latch 25a can be disposed at any position on the distal end of the collet wing 22a sufficient to couple to the distal end of the other collet wing 22b. In some cases, the latch 25a can be defined on the collet wing 22a, or in other cases the latch 25a can be adjoined to the collet wing 22a (e.g., coupled to the collet wing during the manufacturing process). The latch 25a can protrude from the collet wing 22a and towards another collet wing, for example towards an adjacent collet wing.

Another collet wing (e.g., 22b) can include a corresponding coupler (e.g., 25b). The coupler 25b can be included at the distal end of the other collet wing 22b. In some cases, the coupler 25b can be defined on the distal end of the other collet wing 22b. Alternatively, in some cases the coupler 25b can be adjoined to the other collet wing 22b. The coupler 25b can be configured to couple or mate to the latch 25a of the collet wing 22a, thereby securing the distal ends of each collet wing to one another.

The latches 25a, 25b may be comprised of stainless steel, titanium, nickel, Nitinol, carbon fiber, fiber reinforced plastic, and the like. In some cases, the latches 25a, 25b may be comprised of the same material as the collet wings 22a, 22b. In alternative cases, the latches 25a and 25b may be comprised of a different material as the collet wings 22a and 22b.

When secured to one another, the portion of the collet lumen defined by the collet wings 22a, 22b can include a cross-sectional area substantially similar to the portion of the lumen defined by the collet base portion 22. In some cases, the cross-sectional area of the collet lumen can distally taper from the collet base portion 22. In some cases, the collet wings 22a, 22b can be structurally biased such that, when unsecured at the distal ends, the collet lumen defined by the collet wings 22a, 22b may have an increasing or changing cross-sectional area as the cross-section moves distally away from the collet base portion 22.

The collet wings 22a, 22b can be secured to one another by applying a compressive force on the distal ends of the collet wings 22a, 22b. For example, a user (e.g., a physician or other medical professional) may "pinch" the distal ends together such that the latch 25a and the coupler 25b contact one another. In some other cases, the cannula system in which the cannula collet is implemented with can include a clamping mechanism. For example, the cannula system can include a clamping tube that defines a clamping lumen, where the collet is translatable within the clamping lumen. As the clamping tube is moved distally away from the collet base portion 22, the clamping tube can apply a compressive force to the collet wings 22a, 22b sufficient for the latch 25a and coupler 25b to contact each other. In other cases, the clamping tube may be spring-loaded. For example, a spring may apply a force on the clamping tube that translates the clamping tube distally away from the collet base portion. The spring may be secured in a compressed state until unsecured (e.g., the clamping tube may be secured to the collet base portion).

Figure 7:
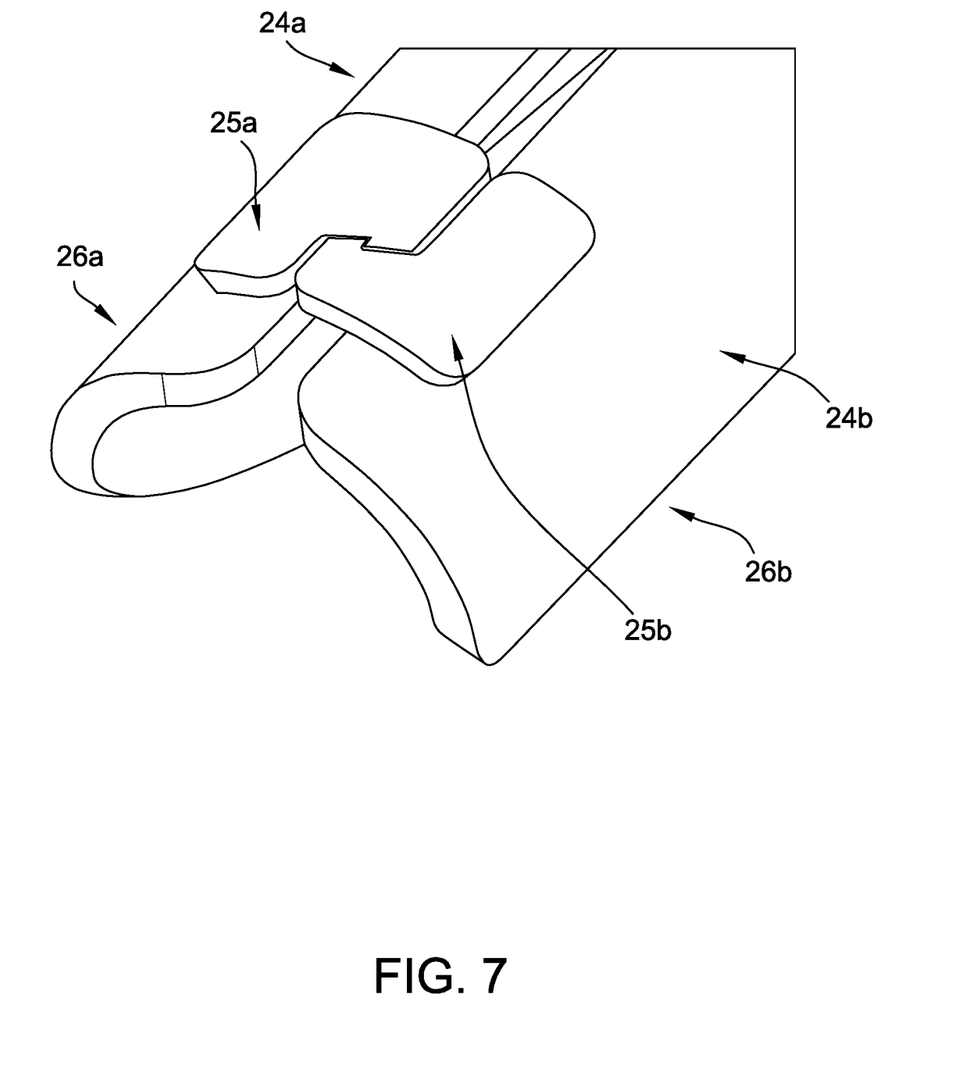
Figure 8:
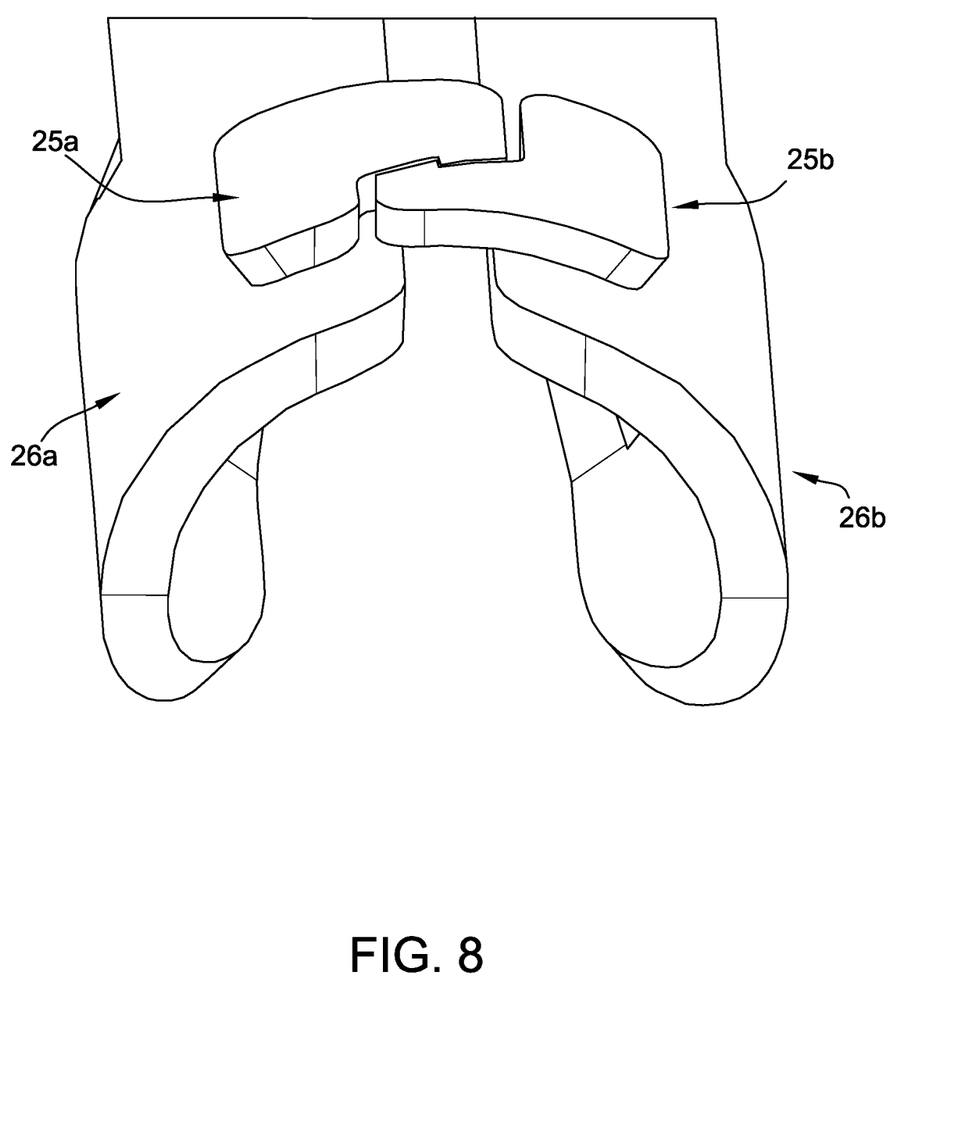

The latch, coupler, or both, can include a variety of embodiments. For example, FIG. 6 depicts an embodiment where the coupler 25b is a corresponding latch, and each latch further defines slots for receiving the latch of the other collet wing. FIGS. 7 and 8 depict zoom-in perspectives of the latch embodiment of FIG. 6.

Figure 9:
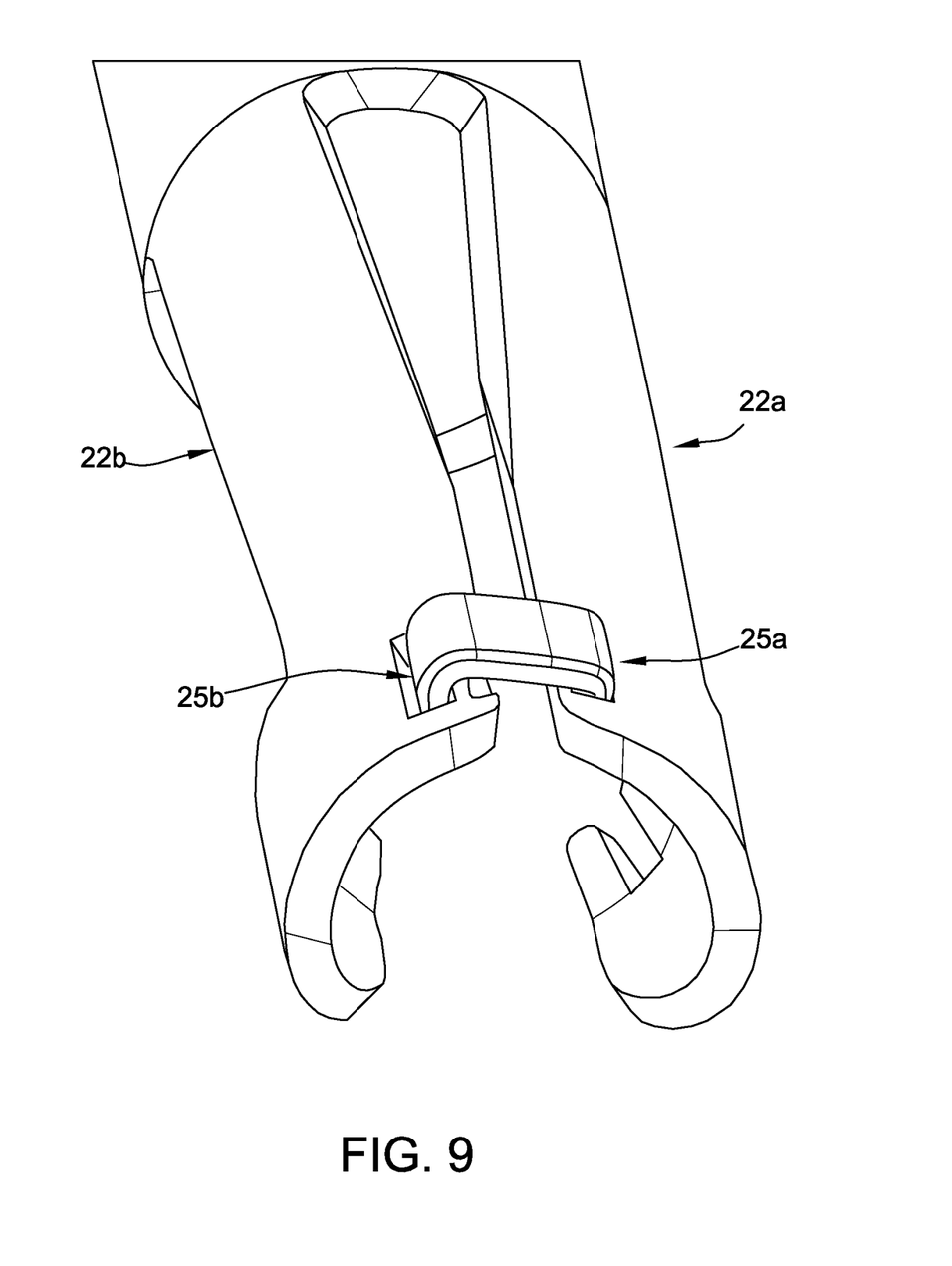

FIG. 9 depicts an embodiment where the coupler 25b includes a slot defined by the collet wing 22b. The slot can be configured to receive the latch 25a when in contact with the latch.

Figure 10:
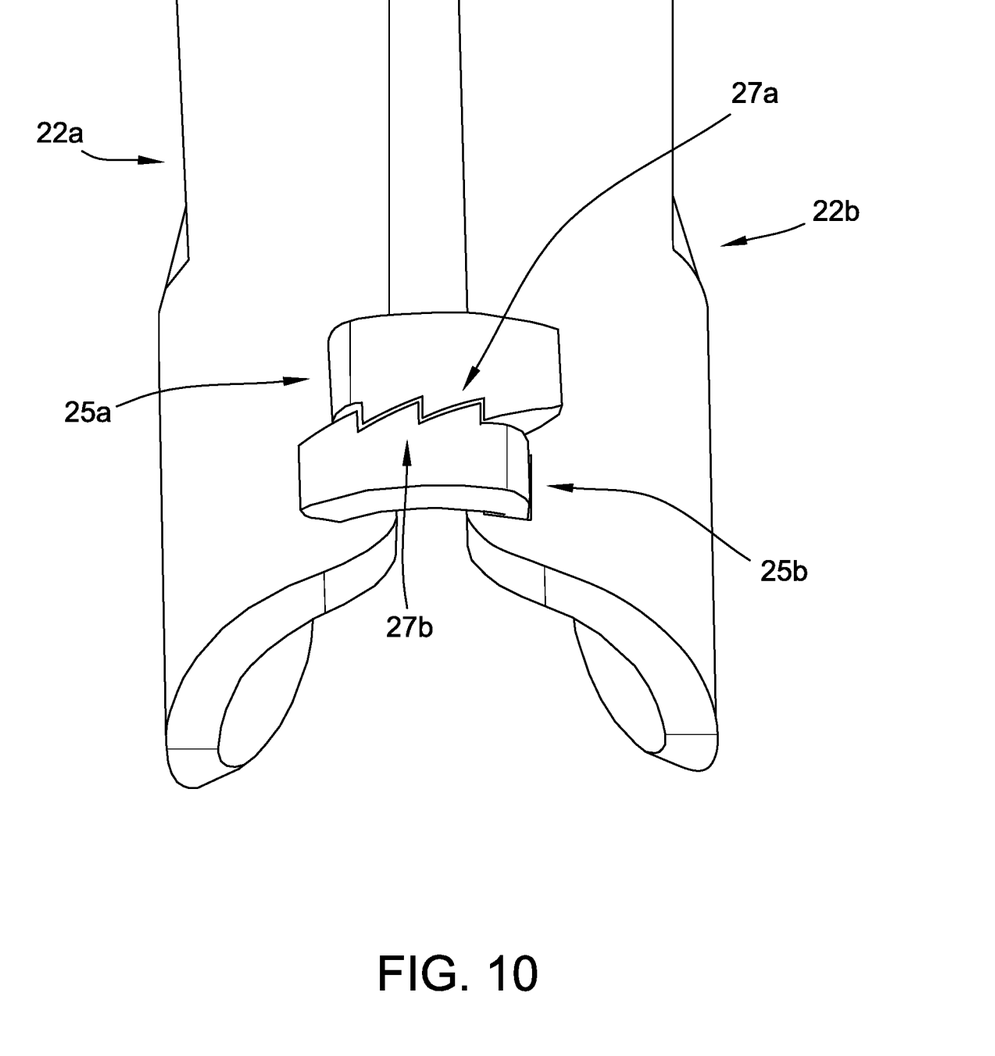

FIG. 10 depicts an embodiment where the coupler 25b is a corresponding latch. Each latch can include a toothed edge configured to receive the toothed edge of the other latch. For example, each latch can include a plurality of teeth 27a, 27b along the toothed edge. The collet wings may be secure to each other when one or more of the teeth of one latch is in contact with one or more teeth of the other latch. In some cases, a subset of teeth of one latch can be coupled to a subset of teeth of another latch to secure the collet wings to each other.

The toothed edges can provide a variable amount of radial force in securing the collet wings to each other. For example, in the embodiment depicts in FIG. 10, the latch 25a and the coupler 25b includes three teeth 27a, 27b along the securing surface of the respective latch/coupler. The latch 25a and coupler 25b can be secured to one another by coupling 1 tooth from each latch/coupler, by 2 teeth from each latch/coupler, or by 3 teeth from each latch/coupler. The higher the number of teeth coupled to one another, the more secure the latch 25a and coupler 25b are to one another. Further, the greater number of teeth coupled to one another, the smaller the collet lumen diameter becomes at the distal end, thereby placing a greater force on the cannulated vessel (e.g., which can aid in securing the cannula collets to the vessel walls).

Cannula Tangs

Figure 11:
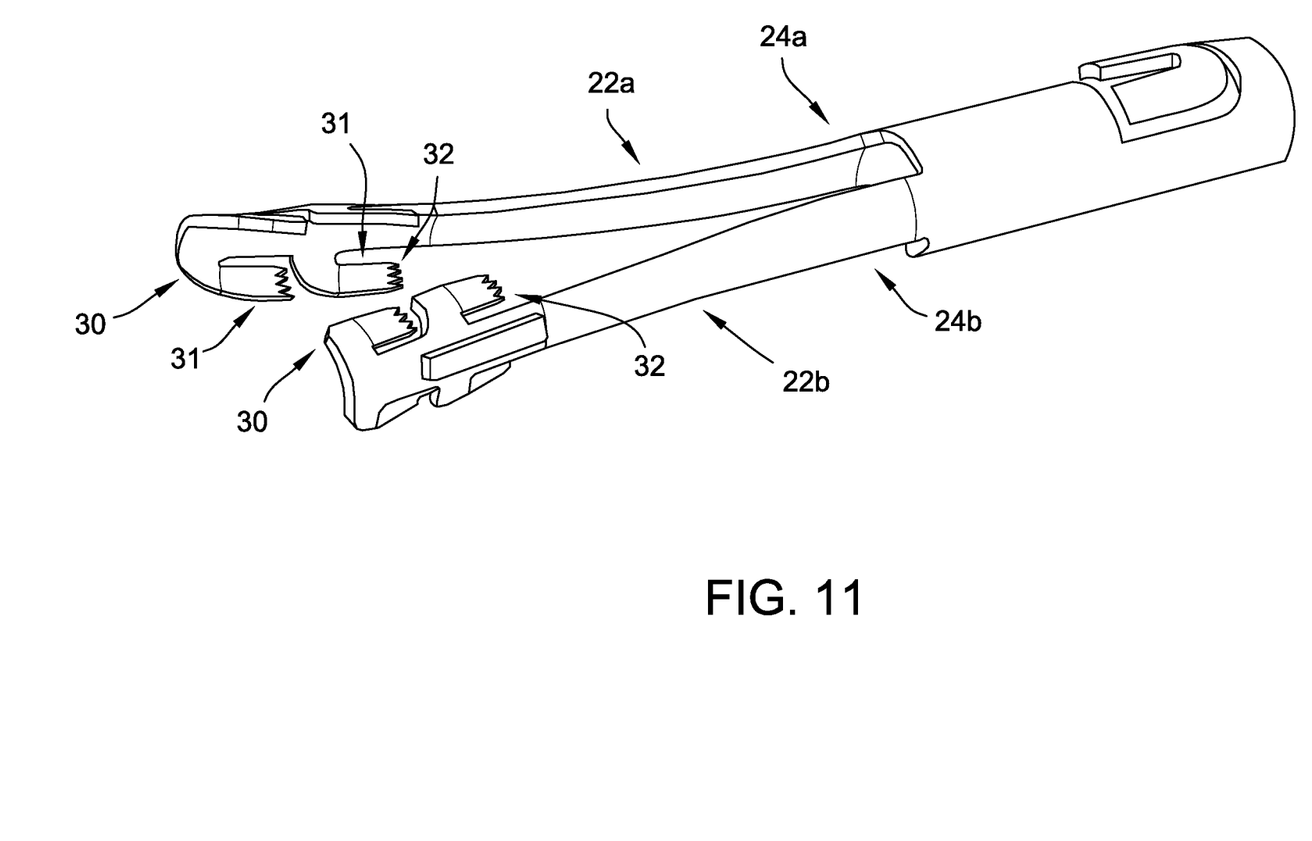
FIGS. 11 and 12 depict cannula collets according to embodiments of the present disclosure.

In some embodiments, the cannula collet can include a set of tangs. For example, the distal end of the collet wings can include concentric portions 30 that extend concentrically from the distal end (e.g., to further define the cannula lumen). The distal end of the cannula collet can define concentric portions 30 at different positions along the length of the distal end. For example, FIG. 11 depicts a cannula collet defining 4 concentric portions along each collet wing 22a, 22b.

Figure 12:
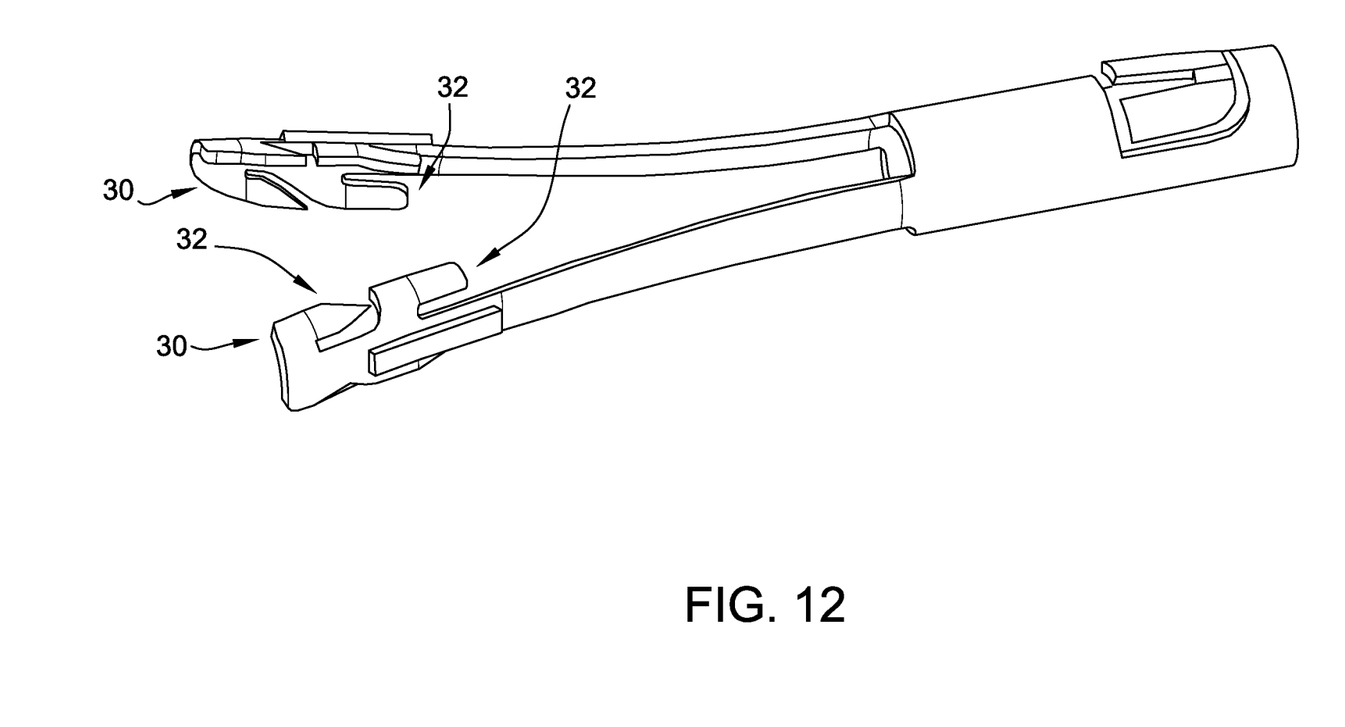

A concentric portion 30 can further define a tang 31. The tang 31 can extend from the concentric portion 30 and towards the base portion of the cannula collet. The tang end 32 can define various surfaces configured for coupling the cannula collet to the exterior of a cannulated vessel. For example, the tang end 32 depicted in FIG. 11 define a set of teeth. In other examples, such as the cannula collet depicted in FIG. 12, the tang end 32 can define a pointed edge, or a rounded edge. In some cases, as shown in FIG. 12 different tang ends 32 can define different end shapes along the same collet wing, or across the cannula collet.

In some cases, the tang 31 can be biased to angle in towards the cannula lumen, such that the tang end 32 is angled into the cannula lumen. When in use, the cannula collet can be positioned around the exterior surface of a blood vessel. The distal ends of the collet wings can be compressed onto the blood vessel (e.g., via manual compression or the axially sliding tube 3 discussed with reference to FIG. 1). While compressed, the tang ends 32 can insert into the exterior surface of the blood vessel. This insertion can maintain the compressed state of the collet wings 22a, 22b, which can assist in mitigating cannula collet repositioning with respect to the blood vessel. Further, the tang end insertion can also mitigate cannula collet repositioning translationally with respect to the blood vessel.

Cannula System and Method Using the Same

Figure 13:
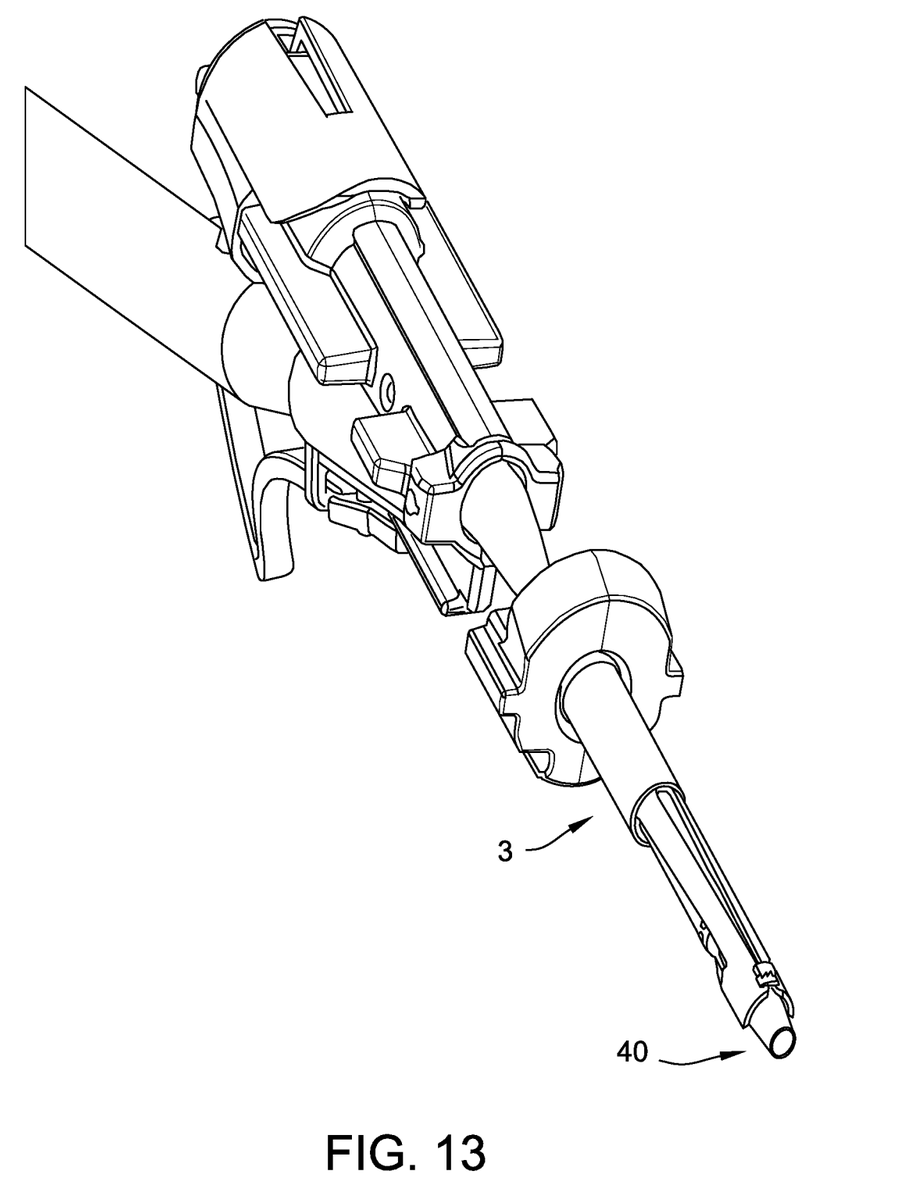
FIG. 13 depicts a cannula system implementing a cannula collet according to an embodiment of the present disclosure.

The cannula collet can be implemented in a cannula system, such as the cannula system depicted in FIG. 13. For example, the cannula system may include a cannula insertion device (not shown) such as a dilator and configured to open a passageway into a vessel and insert a cannula into the vessel, such that blood can move from the vessel into the cannula, or vice versa. The cannula system can also include a needle assembly, a dilator assembly, and a cannula.

For example, the cannula system can be configured to penetrate a targeted blood vessel, expand the opening in the vessel wall, connect the cannula to the vessel (e.g., by inserting a portion of the cannula 40 into the blood vessel through the created opening), and secure the cannula to the vessel via the cannula collet and collet latch system described herein.

In some cases, the cannula system can include a cannula insertion device. The cannula insertion device can include a housing that defines a housing recess therein. The recess may receive a cannula system therein. The cannulation insertion system can include a needle assembly. The housing recess can be configured to receive the needle assembly. The needle assembly can include a needle, which is configured to pierce a vessel thereby creating a passage into the vessel.

The cannula insertion system can further include a dilator assembly. In one embodiment, the dilator assembly functions to house the needle and create a larger opening in the blood vessel after the end of the needle pierces the wall of the blood vessel. Expanding the opening in the blood vessel can help insert a cannula into the vessel.

The cannula system can further include a cannula that is configured to fluidly connect to the vessel to be cannulated at one end and to a circulation system at another end. The cannula can define a cannula lumen that extends the length of the cannula.

In one embodiment, the cannula system provides a method for a clinician to securely attach the cannula to the cannulated region such as, without limitation, a blood vessel. In this regard, the method comprises the steps inserting a cannula into a lumen defined by the blood vessel; positioning a first collet wing and a second collet wing along an external surface of the blood vessel, wherein the first collet wing and the second collet wing define a collet lumen, and the cannula is positioned within the collet lumen; exerting a compressive force on a distal end of the first collet wing and a distal end of the second collet wing; and securing the first collet wing to the second collet wing via a latch defined on the first collet wing and a coupler defined on the second collet wing.

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A cannula system for cannulating a blood vessel comprising:
  a collet comprising at least a first collet wing and a second collet wing and defining a collet lumen, where each of the first collet wing and the second collet wing define a distal end and a proximal end;
  a cannula positioned within the collet lumen;

a latch defined on the distal end of the first collet wing; and a coupler defined on the distal end of the second collet wing and configured to couple to the latch of the first collet wing, thereby securing the first collet wing to the second collet wing.

2. The cannula system of claim 1, wherein a diameter of the collet lumen at a distal end of the collet is variable based on whether the latch and the coupler are secured to each other.

3. The cannula system of claim 1, wherein the coupler comprises another latch.

4. The cannula system of claim 3, wherein the latch and the other latch each comprises a protrusion and a recess, wherein the protrusion of the latch is configured to engage with the recess of the other latch, and the protrusion of the other latch is configured to engage with the recess of the latch.

5. The cannula system of claim 1, wherein the coupler comprises a notch defined by the second collet wing and configured to receive an end of the latch.

6. The cannula system of claim 1, wherein the latch defines a toothed edge, and the coupler comprises another latch with another toothed edge configured to receive the toothed edge of latch of the first collet wing.

7. The cannula system of claim 6, wherein the toothed edge of the latch and the toothed edge of the other latch each comprises a plurality of teeth, and wherein a subset of the plurality of teeth of the latch can be in contact with a subset of the plurality of teeth of the other latch for securing the first collet wing to the second collet wing.

8. The cannula system of claim 1, wherein the cannula is composed of stainless steel, cobalt chrome alloy, titanium, nickel-titanium alloy, tantalum, tungsten plated nickel, tungsten plated brass, polycarbonate, PEEK, PES, fiber-reinforced plastic, or a combination thereof.

9. The cannula system of claim 1, further comprising:
a clamp defining a clamping lumen, wherein the collet is translatable through the clamping lumen.

10. The cannula system of claim 9, wherein the first collet wing and the second collet wing are configured to secure to each other as the clamp translates distally away from the proximal ends.

11. The cannula system of claim 1, wherein the cannula system is configured to be operatively connected to an extracorporeal membrane oxygenation system.

12. The cannula system of claim 1, wherein the blood vessel is a blood vessel of an umbilical cord of a neonate.

13. A method of cannulating a blood vessel in a tissue, comprising:
inserting a cannula into a lumen defined by the blood vessel;
positioning a first collet wing and a second collet wing along an external surface of the blood vessel, wherein the first collet wing and the second collet wing define a collet lumen, and the cannula is positioned within the collet lumen;
exerting a compressive force on a distal end of the first collet wing and a distal end of the second collet wing; and
securing the first collet wing to the second collet wing via a latch defined on the first collet wing and a coupler defined on the second collet wing.

14. A cannula system for cannulating a blood vessel comprising:
a collet comprising at least a first collet wing and a second collet wing and defining a collet lumen, where each of the first collet wing and the second collet wing define a distal end and a proximal end;
a cannula positioned within the collet lumen;
a latch defined on the distal end of the first collet wing, wherein the latch defines a toothed edge; and
a coupler defined on the distal end of the second collet wing and configured to couple to the latch of the first collet wing, thereby securing the first collet wing to the second collet wing, and
wherein the coupler comprises another latch with another toothed edge configured to receive the toothed edge of the latch of the first collet wing.

15. The cannula system of claim 14, wherein the toothed edge of the latch and the toothed edge of the other latch each comprises a plurality of teeth, and wherein a subset of the plurality of teeth of the latch can be in contact with a subset of the plurality of teeth of the other latch for securing the first collet wing to the second collet wing.

16. The cannula system of claim 14, wherein a diameter of the collet lumen at a distal end of the collet is variable based on whether the latch and the coupler are secured to each other.

17. The cannula system of claim 14, further comprising:
a clamp defining a clamping lumen, wherein the collet is translatable through the clamping lumen.

18. The cannula system of claim 17, wherein the first collet wing and the second collet wing are configured to secure to each other as the clamp translates distally away from the proximal ends.

19. The cannula system of claim 14, wherein the cannula system is configured to be operatively connected to an extracorporeal membrane oxygenation system.

20. The cannula system of claim 14, wherein the tissue includes an umbilical cord of a neonate.

* * * * *